United States Patent
Bates et al.

(10) Patent No.: US 6,574,625 B1
(45) Date of Patent: Jun. 3, 2003

(54) REAL-TIME BOOKMARKS

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 09/660,125

(22) Filed: Sep. 12, 2000

(51) Int. Cl.[7] .......................... G06F 17/30; G06F 15/16
(52) U.S. Cl. ..................... 707/5; 707/10; 707/104.1; 707/102; 709/217; 709/218; 709/203
(58) Field of Search ................................ 707/10, 104.1, 707/501, 102, 5; 709/203, 217, 218; 345/357, 335, 333

(56) References Cited

U.S. PATENT DOCUMENTS

| | | | |
|---|---|---|---|
| 6,037,934 A | * 3/2000 | Himmel et al. | 345/333 |
| 6,182,113 B1 | * 1/2001 | Marayanaswami | 709/203 |
| 6,184,886 B1 | * 2/2001 | Bates et al. | 345/357 |
| 6,208,995 B1 | * 3/2001 | Himmel et al. | 707/104 |
| 6,211,871 B1 | * 4/2001 | Himmel et al. | 345/335 |
| 6,212,522 B1 | * 4/2001 | Himmel et al. | 707/10 |
| 6,219,679 B1 | * 4/2001 | Brisebois et al. | 707/501 |
| 6,223,178 B1 | * 4/2001 | Himmel et al. | 707/10 |
| 6,226,648 B1 | * 5/2001 | Appleman et al. | 707/102 |
| 6,247,021 B1 | * 6/2001 | Himmel et al. | 707/104 |
| 6,256,639 B1 | * 7/2001 | Himmel et al. | 707/104 |
| 6,314,423 B1 | * 11/2001 | Himmel et al. | 707/10 |
| 6,321,228 B1 | * 11/2001 | Crandall et al. | 707/10 |
| 6,324,566 B1 | * 11/2001 | Himmel et al. | 709/203 |
| 6,334,145 B1 | * 12/2001 | Adams et al. | 709/217 |

* cited by examiner

Primary Examiner—Frantz Coby
(74) Attorney, Agent, or Firm—Moser, Patterson & Sheridan, LLP; Gero G. McClellan (57) ABSTRACT

The present invention generally provides a method, article of manufacture and apparatus for selecting and displaying real-time bookmarks. Bookmarks are configured and displayed according to predetermined parameters when relevancy conditions established between a currently displayed network address and the bookmarks are satisfied.

33 Claims, 7 Drawing Sheets

BOOKMARKS - 139A

| NETWORK ADD. | KW1 | KW2 | KW3 | KWnth ... | % REL |
|---|---|---|---|---|---|
| WWW.DOG.COM | DOGS | CANINE | PUPPY | ... | 97 |
| WWW.ANIMALS.NET | DOG | PUPPY | BIRD | ... | 77 |
| WWW.LESSON.ORG | ANIMALS | DOG | PUPPY | ... | 67 |
| WWW.LEARN.ORG | ANIMALS | DOG | TRAIN | ... | 54 |
| WWW.DOGWORLD.COM | HOTDOG | DOG | BUN | ... | 15 |
| WWW.IBMCLASS.NET | DOG | SLOW | CRASH | ... | 12 |
| WWW.GUITAR.COM | LICKS | THE MONKEYS | GUITAR | ... | 5 |

*Fig. 4*

VISITED - 139B

| NETWORK ADD. | KW1 | KW2 | KW3 | KWnth | % REL |
|---|---|---|---|---|---|
| WWW.DOG.COM | DOGS | CANINE | PUPPY | ... | 97 |
| WWW.ANIMALS.NET | DOG | PUPPY | BIRD | ... | 77 |
| WWW.LESSON.ORG | ANIMALS | DOG | PUPPY | ... | 67 |
| WWW.LEARN.ORG | ANIMALS | DOG | TRAIN | ... | 54 |
| WWW.DOGWORLD.COM | HOTDOG | DOG | BUN | ... | 15 |
| WWW.IBMCLASS.NET | DOG | SLOW | CRASH | ... | 12 |
| WWW.GUITAR.COM | LICKS | THE DOGS | GUITAR | ... | 5 |
| WWW.FRECNH.COM | FRENCH | BOJOUR | PARIS | ... | 1 |
| WWW.SLIDE.NET | GLASS | METAL | TECH | ... | 3 |
| WWW.IBMPROD.COM | IBM | BEST | IC | ... | 2 |
| WWW.ABC.ORG | TV | SHOW | GUIDE | ... | 1 |
| WWW.TRAVEL.COM | TRAVEL | AIRLINES | TICKET | ... | 1 |
| WWW.HOLIDAY.NET | TRAVEL | TICKETS | BUS | ... | 3 |

*Fig. 5*

TOPIC KEYWORDS- 139C

| CURRENT NETWORK ADD. | KW1 | KW2 | KW3 | KWnth ... |
|---|---|---|---|---|
| WWW.DOG.COM | DOGS | ANIMALS | PET | ... |

REAL-TIME BOOKMARKS

BACKGROUND OF THE INVENTION

1. Field of the Invention

The present invention relates to data-processing. More particularly, the invention relates to processing previously-visited network addresses.

2. Background of the Related Art

Computer networks were developed to allow multiple computers to communicate with each other. In general, a network can include a combination of hardware and software that cooperate to facilitate the desired communications. One example of a computer network is the Internet, a sophisticated worldwide network of computer system resources.

The growing size of networks, particularly the Internet, makes it difficult to locate (or re-locate) relevant information in an expedient fashion. As a result, search tools were developed to locate information on the network based on a query input by a user. Two common search methods include the use of search engines and directories, both having capability to search listings. One difference between search engines and directories is in the manner in which each tool compiles listings. Search engines comprise a search tool referred to as a spider, a crawler or a robot, which builds indexes containing the traversed addresses according to well-known protocols and algorithms. A user-input query in the form of phrases, keywords, network addresses, etc., prompts the search engine to sift through the plurality of network addresses (typically on the order of millions) in the index to find matches to the user query. The results are then displayed to the user for review and selection. One example of a search engine developed for use on the Internet is HotBot®.

The advantages of search engines are harnessed by network browser applications. Networks, such as the Internet, require a network browser to enable navigation between network addresses. A browser is an application program or facility that normally resides on a user's workstation and which is invoked when the user decides to access network addresses. A prior art Internet browser program typically accesses a given network address according to an addressing format known as a uniform resource locator (URL). The browser also processes each type of data which is presented to it, and forwards and receives data to and from the network. State-of-the-art browsers provide a complete multimedia experience, including video, pictures, 3-D images, sounds and the like.

Browsers provide useful features that facilitate management of the voluminous information encountered by users. For example, most commercially available Internet browsers (e.g., Netscape's Navigator® and Windows' Explorer®) provide a history folder containing recently visited network addresses (e.g., web sites) and a bookmark folder to which a user can store network addresses for future retrieval.

A user searching (referred to as browsing) the network for information may visit a plurality of network addresses using the browser program. When the user finds a site of interest, to which he or she may want to return, the user may store the address for the site as a bookmark. The bookmark is typically stored within the bookmark folder, or sub-folder, accessible to the browser program. Subsequently, the user may return to the network address by accessing the bookmark folder, and subfolders, rather than attempting to locate the network address using a search engine or directory. Thus, bookmarks provide the user a convenient means of facilitating information storage and retrieval.

However, as the number of bookmarks grow the user must organize and maintain the bookmarks under the various folders, and sub folders, which can quickly become a tedious and often difficult task. Thus, overtime, bookmarks and bookmark folders become unmanageable due to the volume of address contained therein. Therefore, frustrated users avoid adding additional network addresses to the bookmark folders, thereby rendering the folders useless and requiring the user to rely on search tools to revisit sites. Therefore, there is a need to help the user manage, categorize, and retrieve relevant previously-visited network addresses, and display the results in a meaningful way.

SUMMARY OF THE INVENTION

The present invention generally provides a method, article of manufacture and apparatus for configuring and displaying real-time bookmarks. Illustratively, the present invention allows for a relevancy value determination between a currently-accessed network resource and a previously-visited network resource.

In one aspect of the invention, a method is provided for establishing a relevancy value between a previously-visited network resource and a currently-accessed network resource, wherein the currently-accessed network resource is accessed by a browser program executing on a computer connected to a network of computers. The method comprises accessing information associated with the previously-visited network resource and determining the relevancy value between the previously-visited network resource and the currently-accessed network resource by using the information associated with the previously-visited network resource.

In another aspect of the invention, a signal-bearing medium containing a configuration program is provided for establishing a relevancy value between a previously-visited network resource and a currently-accessed network resource. When executed by a processor, the program performs a method comprising accessing information associated with the previously-visited network resource and determining the relevancy value between the previously-visited network resource and the currently-accessed network resource by using the information associated with the previously-visited network resource.

In still another aspect of the invention, a computer system connected to a network of computers is provided. The computer system comprises a processor and a memory containing a previously-visited network resource containing content and a browser program accessing a current network resource and a configuration program which, when executed by the processor, is adapted to perform a method. The method comprises accessing information associated with the previously-visited network resource; and determining the relevancy value between the previously-visited network resource and the currently-accessed network resource by using the information associated with the previously-visited network resource.

BRIEF DESCRIPTION OF THE DRAWINGS

A more particular description of the invention, briefly summarized above, may be had by reference to the embodiments thereof which are illustrated in the in the appended drawings.

It is to be noted, however, that the appended drawings illustrate only typical embodiments of this invention and are

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides a method, article of manufacture and apparatus for configuring and displaying real-time bookmarks. Illustratively, the present invention allows for a relevancy value determination between a currently-accessed network resource and a previously-visited network resource. As will be described below, aspects of the preferred embodiment pertain to specific method steps implementable on computer systems.

In one embodiment, the invention may be implemented as a computer program-product for use with a computer system. The programs defining the functions of the preferred embodiment can be provided to a computer via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 1:
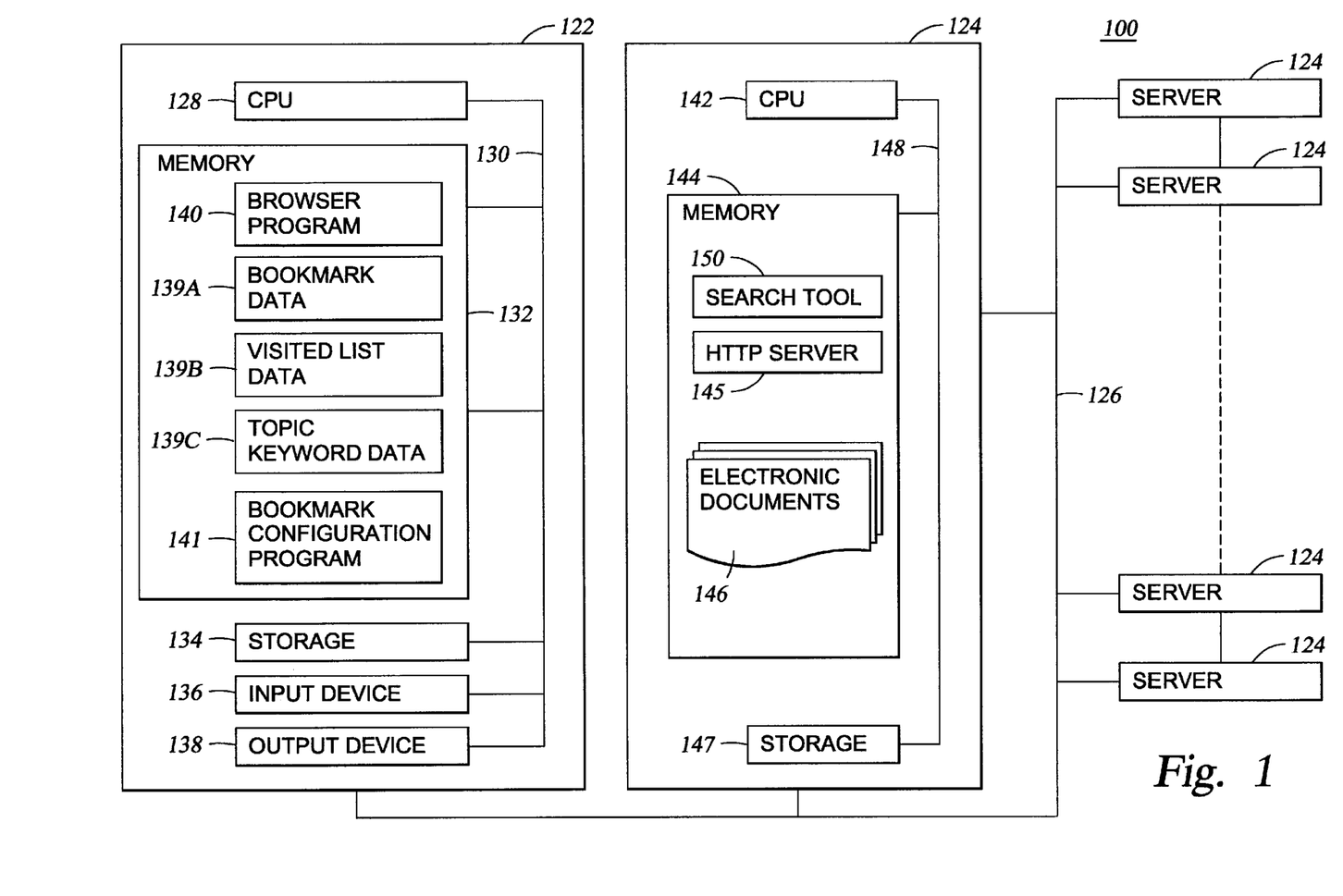
FIG. 1 depicts a data processing system in which the preferred embodiment may be implemented.

FIG. 1 depicts a data processing system 100 in which the preferred embodiment of the invention may be implemented. In general, the data processing system 100 includes a client (e.g. user's) computer 122 and at least one server 124 (five such servers 124 are shown). The client computer 122 and the server computer 124 may be the components of the same computer system, or may be connected via a network 126, such as the Internet.

The client computer 122 includes a Central Processing Unit (CPU) 128 connected via a bus 130 to a memory 132, storage 134, input device 136, and output device 138. The input device 136 can be any device to give input to the client computer 122. For example, a keyboard, keypad, light-pen, touch-screen, track-ball, or speech recognition unit, audio/video player, and the like could be used. The output device 138 is preferably any conventional display screen and, although shown separately from the input device 136, the output device 138 and input device 136 could be combined. For example, a display screen with an integrated touch-screen, and a display with an integrated keyboard, or a speech recognition unit combined with a text speech converter could be used.

Memory 132 is preferably random access memory sufficiently large to hold the necessary programming and data structures of the invention. While memory 132 is shown as a single entity, it should be understood that memory 132 may in fact comprise a plurality of modules, and that memory 132 may exist at multiple levels, from high speed registers and caches to lower speed but larger DRAM chips.

Memory 132 contains a browser program 140 that, when executed on CPU 128, provides support for navigating between the various servers 124 and locating network addresses at one or more of the servers 124. In one embodiment, the browser program 140 includes a web-based Graphical User Interface (GUI), which allows the user to display electronic resource(s) 146 (e.g., web pages, and other electronic documents) located on the network 126.

The browser program 140 is adapted to store previously-visited network addresses within a data structure. Illustratively, storing is accomplished by allowing a user to "bookmark" a network address for future retrieval from a bookmark data structure 139A. The bookmark is typically accessible to the user within a bookmark folder, or subfolder, accessible using the browser program 140.

Memory 132 also contains a bookmark configuration program 141 that, when executed on CPU 128, provides support for configuring bookmark accessibility and display. In various embodiments, the bookmark configuration program 141 can be separate from, or integral to the browser program 140.

Memory 132 also comprises various data structures used by the browser program 140 and/or the configuration program 141. Illustratively, memory 132 is shown containing a visited network address data structure 139B, and a topic keyword data structure 139C. The use of the data structures 139 is described in more detail below.

In another embodiment, the data structures 139 are located remotely (e.g., on server 124) and made accessible to the browser program 140 and/or the configuration program 141 residing on client 122. This allows data structures 139 to be portable and available to a plurality of browsers via the network 126. In addition, the individual contents of 139 may be distributed within the network 126 between client components and server components.

Storage device 134 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Each server computer 124 generally comprises a CPU 142, a memory 144, and a storage device 146, coupled to one another by a bus 148. Memory 144 is a random access memory sufficiently large to hold the necessary programming and data structures that are located on the server computer 124. As shown, the memory 144 includes a Hypertext Transfer Protocol (http) server process 145 adapted to service requests from the client computer 122. For example, process 145 may respond to requests to access electronic resource(s) 146 (e.g., HTML documents, network information, and the like) residing on the server 124. The http server process 145 is merely illustrative and other embodiments adapted to support any known and unknown protocols are contemplated. The programming and data structures may be accessed and executed by the CPU 142 as needed during operation.

FIG. 1 is merely one hardware configuration for data processing system 100. A preferred embodiment of the present invention can apply to any comparable hardware configuration, regardless of whether the computer system is a complicated, multi-user computing apparatus, a single-user workstation, or network appliance that does not have non-volatile storage of its own.

Figure 2:
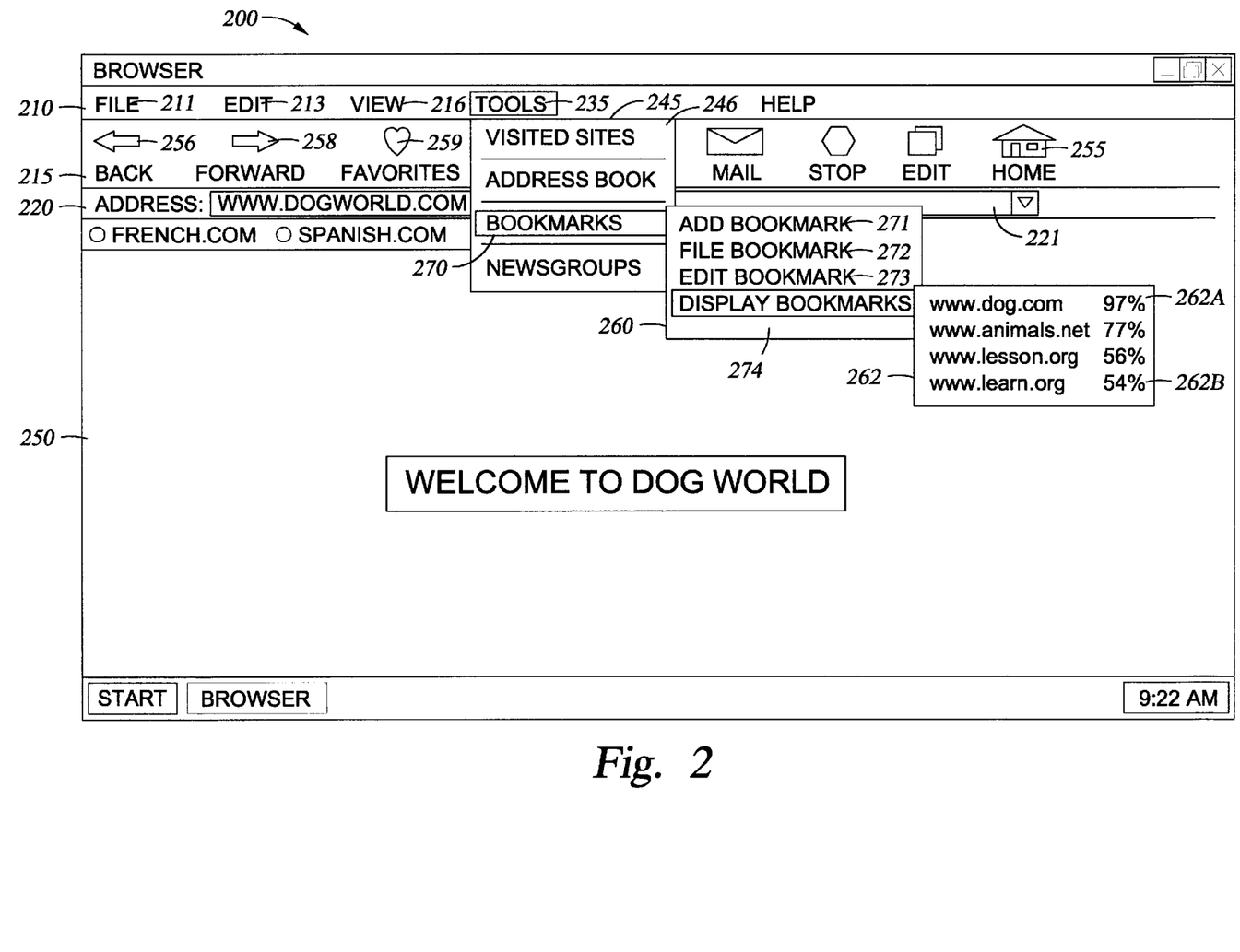
FIG. 2 depicts a browser graphical user interface display screen allowing the user to select real-time bookmarks.

FIG. 2 depicts a browser interface 200 integral to the browser program 140 for use with the present invention and may be displayed by the output device 138 (see FIG. 1). In general, browser interface 200 includes features (e.g., radio buttons and check-boxes) for selecting and customizing browser settings, bookmark data, previously-visited network addresses, and the like.

A menu toolbar 210 incorporates user file manipulation selections and browser setting selections such as "file" 211, "edit" 213, "view" 216, and the like. A navigation toolbar 215 includes features typically used for navigation such as a "back" button 256 and "forward" button 258 to move backward or forward one or more network addresses previously visited, a "favorites" button 259 to more quickly access specific network addresses, a "home" button 255 to access the homepage network address, and the like. Address toolbar 220 includes an address entry window 221 for entering network addresses to be located and browsed.

As illustrated in FIG. 2, when the "tools" menu selection 235 of the menu toolbar 210 is accessed (i.e., "pulled down") a pull-down menu 245 appears with sub-windows to display optional browser settings and functions. When "bookmarks"selection 270 has been selected within the pull-down menu 245, a second pull-down menu 260 appears for selecting specific bookmark functions such as "adding" a bookmark 271, "editing" a bookmark 273, "filing" a bookmark 272, and a "display bookmarks" selection 274. When "display bookmarks" selection 274 is accessed, a pull-down display window 262 appears to display bookmarks stored in data structure 139A. Each item of the "tools" menu 235 may be similarly accessed and may have an associated data structure 139 containing contents specific to that item. For example, the information associated with "visited sites" 246 is contained in data structure 139B.

Figure 3:
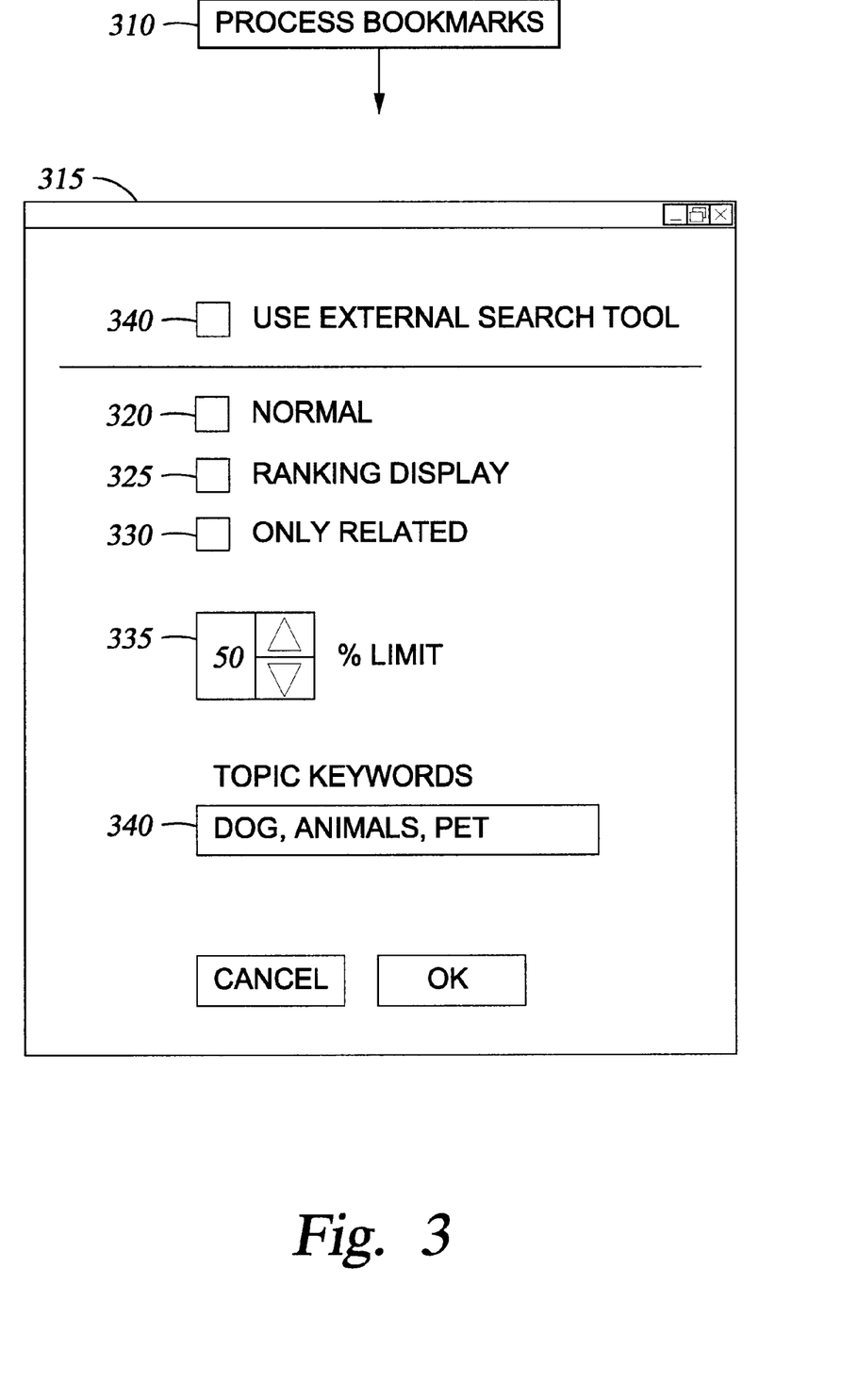
FIG. 3 depicts a graphical user interface display screen to select the type of bookmarks to be displayed.

FIG. 3 depicts an embodiment of the invention using features (e.g., radio buttons and check-boxes) for selecting the bookmarks to display, and activating the search tool 150 for use in the selection process. "Process bookmark" button 310, when 15 selected, activates a "bookmark relevancy" window 315. Bookmark relevancy window 315 comprises a "normal" check box 320, a "ranking display" checkbox 325, and an "only related" checkbox 330. Checkboxes 320, 325, and 330 determine which bookmarks within data structure 139A are to be displayed in display window 262. The "normal" check box 320, when checked, allows the display of all bookmarks. The "ranking display" checkbox 325, when checked, allows the display of all of the bookmarks in order of relevancy value compared to the currently displayed network address. The "only related" checkbox 330 allows only the bookmarks meeting a predetermined relevancy threshold related to the current displayed network address to be displayed.

Window 315 further comprises a relevancy percentage window 335 associated with the "only related" checkbox 330. Thus, when checkboxes 330 is checked, only bookmarks within a predetermined relevancy value threshold entered in the window 335 are allowed to be shown in display window 262. For example, in one embodiment a minimum relevancy value percentage threshold of "50" is entered into window 335 (see FIG. 3). The bookmarks having at least a "50 percent" relevancy value are allowed to be displayed in window 262.

In one embodiment, window 315 further comprises a "use external search tool"check box 340. Check box 340 allows the use of an external search tool configured to process and determine the relevancy value of the bookmarks within data structure 139A with respect to the currently-accessed network address. In another embodiment, window 315 further comprises a "topic keyword" entry/modification window 345 discussed below with reference to FIG. 6.

Figure 4:
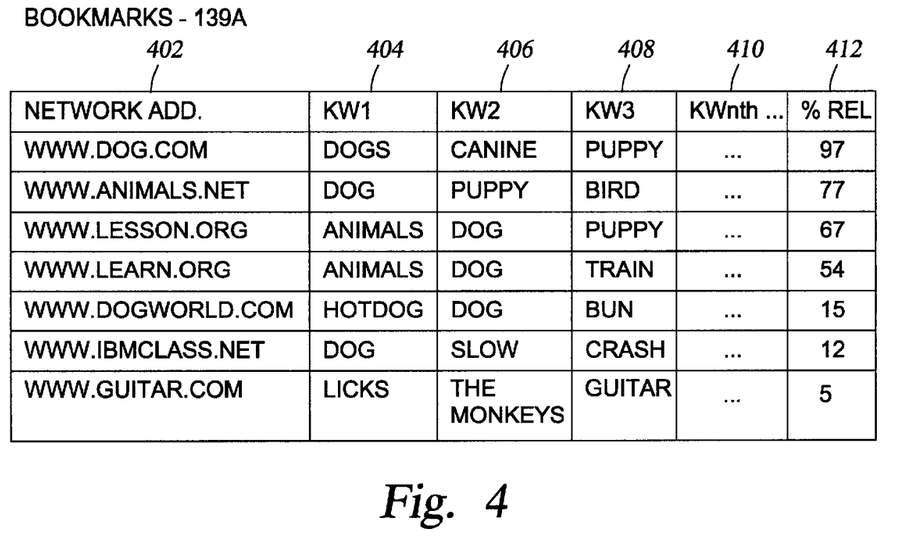
FIG. 4 illustrates bookmark data records and associated subject matter related to real-time bookmarks.
Figure 5:
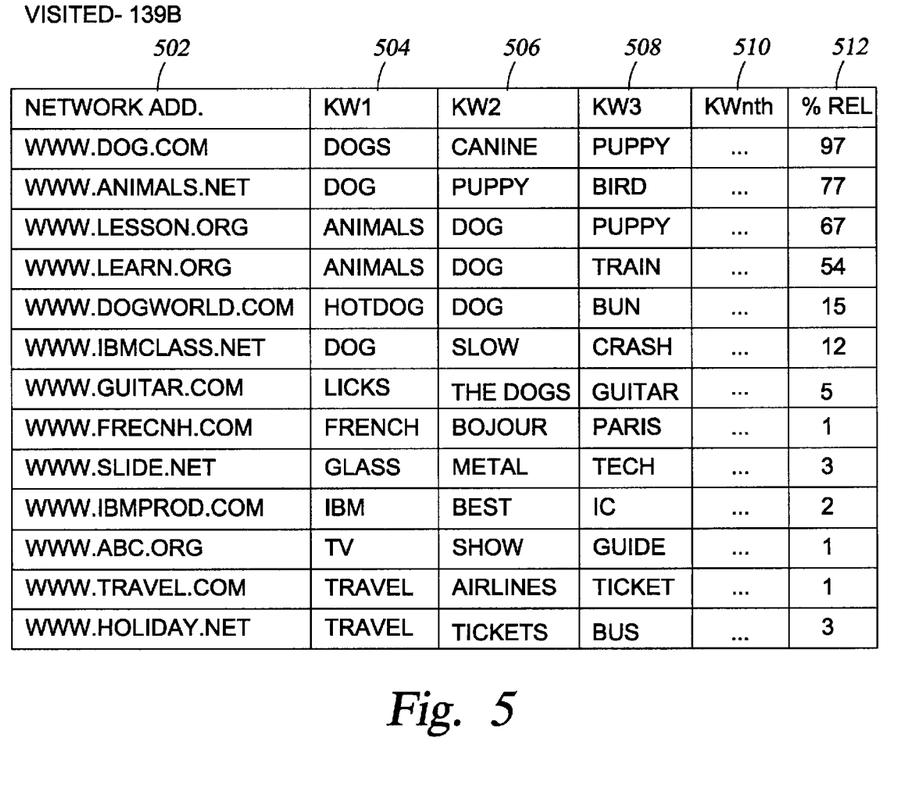
FIG. 5 illustrates previously visited network address data records and associated subject matter.
Figure 6:
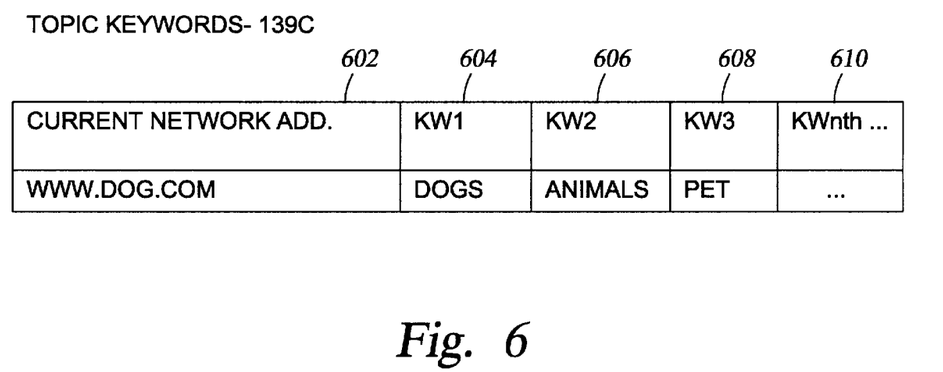
FIG. 6 illustrates a topic keyword data structure for use with real-time bookmarks.

FIGS. 4–6 depict data structure 139 (contained in memory 132). Specifically, FIGS. 1–3 are referenced within the following discussion of FIGS. 4–6 as is necessary. Each data structure 139 is organized as a plurality of rows and columns containing information (e.g., subject matter). The columns designate a particular category of information, including network addresses, keywords, meta tags, and the like, and relevancy values. Each row comprises a data record.

FIG. 4 illustrates one embodiment of data structure 139A containing bookmark data records comprising network addresses and associated subject matter (i.e., information pertaining to each bookmark). Bookmark data provides the user with a convenient means of storing and accessing previously-visited network addresses. For example, a user desiring to return to a particular previously-visited network address in the future may store (i.e., bookmark) the address in data structure 139A by selecting the "add bookmark" selection 271 as shown in FIG. 2. In one embodiment, data structure 139A comprises a network address column 402, and associated subject matter within a first keyword column 404, a second keyword column 406, and a third keyword column 408. An "nth" keyword column 410 is shown to illustrate that a plurality of keyword columns may be used. The relevancy value of the bookmark to the currently-accessed network address is displayed in the relevancy percentage column 412.

FIG. 5 illustrates one embodiment of the data structure 139B containing previously-visited network addresses and associated subject matter. As the user browses the network, the browser program 140 stores the network addresses visited within data structure 139B. The user may access the previously-visited network addresses by selecting "visited sites" selection 246. It should be noted that many of the addresses contained in data structure 139B may also be contained in data structure 139A as bookmarks. Data structure 139B comprises a network address column 502, and associated subject matter comprising a first keyword column 504, a second keyword column 506, and a third keyword column 508. An "nth" keyword column 510 is shown to illustrate that a plurality of keyword columns may be used. The relevancy value of the visited network address to the currently-accessed network address is contained in the relevancy percentage column 512.

FIG. 6 illustrates one embodiment of the present invention, whereby topic keyword subject matter is stored within keyword data structure 139C. Illustratively, data structure 139C comprises a network address column 602, and associated information comprising a first keyword column 604, a second keyword column 606, and a third keyword column 608. An "nth" keyword column 610 is shown to illustrate that a plurality of keyword columns may be used.

Data structure 139C is utilized in some embodiments to increase the "confidence" with regard to the relationship between a bookmark and a currently accessed network address. Many network addresses may have either have insufficient information, or information that covers so many topics that a bookmark relevancy may be difficult to obtain or meaningless. Thus, in one embodiment, the user can then customize current network address information so that the relevancy value between a bookmark and the currently accessed network address is more meaningful. In particular, customization is facilitated by the provision of window 345 (see FIG. 3) which allows the user to modify (e.g., edit, add, delete, replace, and the like) the information of the current network address being accessed, such as "www.dogworld-.com" 250. This information is temporarily stored in "topics keywords" data structure 139C. Once the user changes from the currently accessed network address (e.g., www. dogworld.com 250) to a new network address (e.g., www.animalhouse.com) the information (including any information modifications) from the previously "current" network address (i.e., www.dogworld.com 250), is stored in the previously-visited data structure 139B (see FIG. 5).

Figure 7:
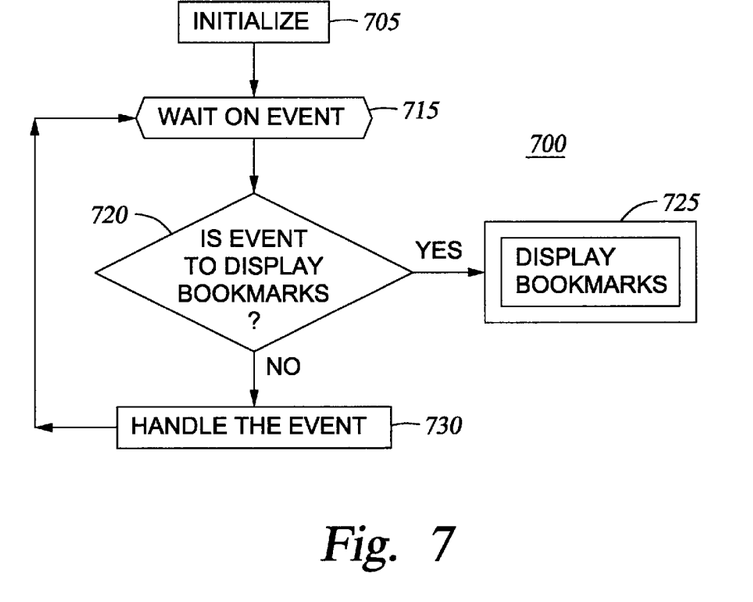
FIG. 7 depicts a flow diagram of a method for displaying real-time bookmarks.

FIG. 7 depicts a flow diagram of a method 700 for configuring real-time bookmarks using a bookmark configuration program 141. As necessary, FIGS. 1–6 are referenced in the following discussion of FIG. 7.

FIG. 7 is entered into at step when the browser program 140 and configuration program 141 are executed. At step 705, the configuration program 141 is initialized, and method 700 proceeds to step 715. At step 715, method 700 receives browser program events.

At step 720, method 700 determines whether the event is for displaying bookmarks. For example, a user selects the "display bookmarks" selection 274 (see FIG. 2). If the event is not displaying bookmark data, then method 700 proceeds to step 730 to handle other events as known in the art, and then returns to step 715 to wait on other events. If the event is for displaying bookmarks, then method 700 proceeds to step 725 to display bookmarks from bookmark data structure 139A and displays the bookmarks in accordance to method 800 described below.

Figure 8:
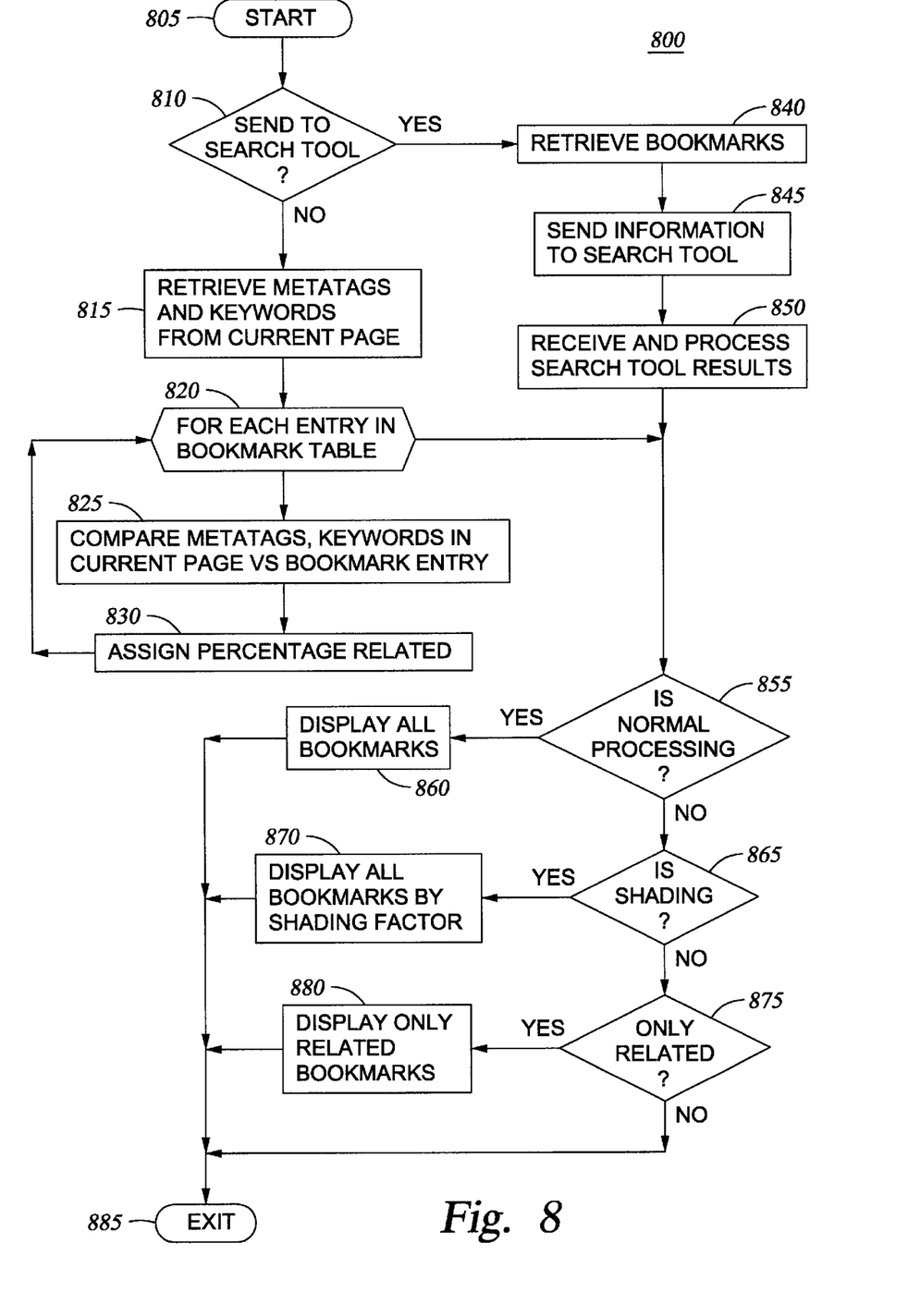
FIG. 8 depicts a flow diagram of a method for selecting and processing bookmark data and subject matter for display.

FIG. 8 depicts a flow diagram of a method 800 for selecting and displaying real-time bookmarks. As necessary, FIGS. 1–7 are referenced in the following discussion of FIG. 8. FIG. 8 is entered into at step 805 at step 725 (see FIG. 7). At step 810, method 800 determines whether the bookmarks and network address currently being visited is to be passed to a search tool 150 adapted to determine the relevancy value of the bookmarks relative to the network address. That is, a determination is made to whether box 340 is selected. If the search tool 150 is selected, method 800 proceeds to step 810 as described below. If not, method 800 proceeds to step 815.

At step 815, method 800 retrieves subject mater (e.g., keywords, meta tags, words, symbols, and the like) from the network address electronic resource 146 located at the currently-accessed network address. At step 820, method 800 retrieves a data record from data structure 139A comprising a bookmark from column 402 and associated keyword subject matter from associated columns 404, 406, 408, and 410.

At step 825, method 800 compares the network address subject matter retrieved to the subject matter in the data record retrieved from step 820. At step 830, method 800 determines and assigns a relevancy value to the bookmark, placing the relevancy value in column 412.

For example, at step 825 for the bookmark "www.dog-.com" 402A as illustrated in FIG. 2, the associated keywords retrieved from columns 404, 406, and 408, are respectively "DOGS," "CANINE," and "PUPPY." At step 830, method 800 compares the keywords "DOGS," "CANINE," and "PUPPY" to the subject matter obtained at step 815 for the currently displayed network address "www.dogworld.com" 250 (see FIG. 2). Method 800 then determines the relevancy value of "www.dogworld.com"250 to the bookmark "www-.dog.com" 402A is 97 percent. Method 800 then places "97%" in column 412 in the row associated with the bookmark "www.dog.com" 402A.

In one embodiment, method 800 uses known algorithms to generate boolean connectors and a query comprising a string of words and phrases derived from the electronic resource 146. Method 800 uses current methods to compare the associated keywords derived from columns 404, 406, and 408 with the string of words and phrases derived from the electronic resource 146 and Boolean connectors to generate a relevancy value.

Method 800, loops between steps 830 and 820 until all the bookmarks from data structure 139A are read and given a relevancy value relative to the currently displayed network address 250 (see FIG. 2). After all of the bookmarks from data structure 139A are processed or read, method 800 proceeds to step 855 described below.

At step 810, if the "use external search tool" check box 340 is selected, method 800 proceeds to step 840. In one embodiment, at step 840, method 800 generates query comprising the bookmark records from 139A, the currently-accessed network address including associated information, and Boolean operators. At step 845, method 800 sends the query to the search tool 150 configured to determine a relevancy value between the currently-accessed network address and the bookmark data records from data structure 139. At step 850, method 800 receives, parses, processes the results of the search tool relevancy determination, and places the associated relevancy value for each bookmark in column 412.

In another embodiment, at step 840, method 800 generates a query comprising the information from the currently-accessed network address and Boolean operators. At step 845, method 800 sends the query to the search tool 150 which then searches for matching network addresses and processes the information as known in the art. At step 850, method 800 receives listings of network addresses matching the query from search tool 150. Each listing has an associated relevancy value as determined by search tool 150. Method 800 parses and compares the network addresses returned by search tool 150 to the network addresses found within data structure 139A. The relevancy value for each matching network address is then placed in column 412. At step 855, method 800 determines whether the user has selected the "normal" checkbox 320. If not, method 800 proceeds to step 865. If so, method 800 proceeds to display all bookmarks from data structure 139A in window 262. Method 800 then proceeds to step 885 and exits to step 725.

At step 865, method 800 determines if the checkbox "ranking display" 325 has been checked. If not, method 800 proceeds to step 875. If the checkbox 325 has been selected, method 800 proceeds to step 870 and displays all bookmarks according to their respective relevancy value. In one embodiment, the more relevant the bookmark is related to the network address, the higher the displayed hierarchical position (e.g., a 100% relevancy value would be placed higher than a 10% relevancy value). In one embodiment, the display of the bookmarks according to their relevancy value is accomplished using a "shading factor" which give the bookmarks a gradient of shading according to their respective relevancy values. Bookmark shading is achieved using color, gray-tones and the like. Method 800 then proceeds to step 885 and exits to step 725.

For example, in FIG. 2, window 262 illustrates bookmark "www.dog.com"262A having a relevancy value of 97 percent and bookmark "www.learn.org" 262B having a relevancy value of 54 percent. Thus, "www.dog.com" 262A is displayed and ranked (e.g., listed) accordingly higher than "www.learn.org" 262B.

At step 875, method 800 determines whether the "related only" checkbox 330 has been checked. If not, method 800 proceeds to step 885 and exits to step 725. If the "related only" checkbox 330 has been checked, method 800 proceeds to step 880. At step 880, method 800 displays bookmarks within a range of a predetermined relevancy value.

For example, consider the case where the range is defined as a relevancy value being greater than or equal to the threshold value entered in window 335 (e.g., 50 percent). In FIG. 2 window 262 illustrates "www.dog.com " 262A having a relevancy value of 97 percent and "www.learn.org" 262B having a relevancy value of 54 percent. All bookmarks having a relevancy value greater than or equal to 50 percent are displayed. Therefore, "www.dog.com" network and "www.learn.org"262B are displayed in window 262 (see FIG. 2).

FIGS. 8–11 merely illustrate methods displaying bookmarks of a browser program 140 with relevant information such as keywords, meta tags, and the like. The invention contemplates establishing and displaying any relevancy between the bookmarks and displayed network address such as dates, times, file size and the like.

Although various embodiments which incorporate the teachings of the present invention have been shown and described in detail herein, those skilled in the art can readily devise many other varied embodiments within the scope of the present invention.

One skilled in the art will recognize that a relevancy value is determinable for any of the data structures 139 with respect to the currently-accessed network address. Furthermore, the relevancy value determined may be used in any configuration of the associated data structures display.

For example, the data records from previously-visited data structure 139B (see FIG. 5) comprise network addresses previously visited, associated information, and relevancy values associated with the currently-accessed network address. It is contemplated that the relevancy values may be used to configure the browser program 140 to display relevant previously-visited network addresses with respect to the currently-accessed network address. Thus, when a user selects "visited sites" selection 246, only relevant previously visited sites are displayed.

Figure 9:
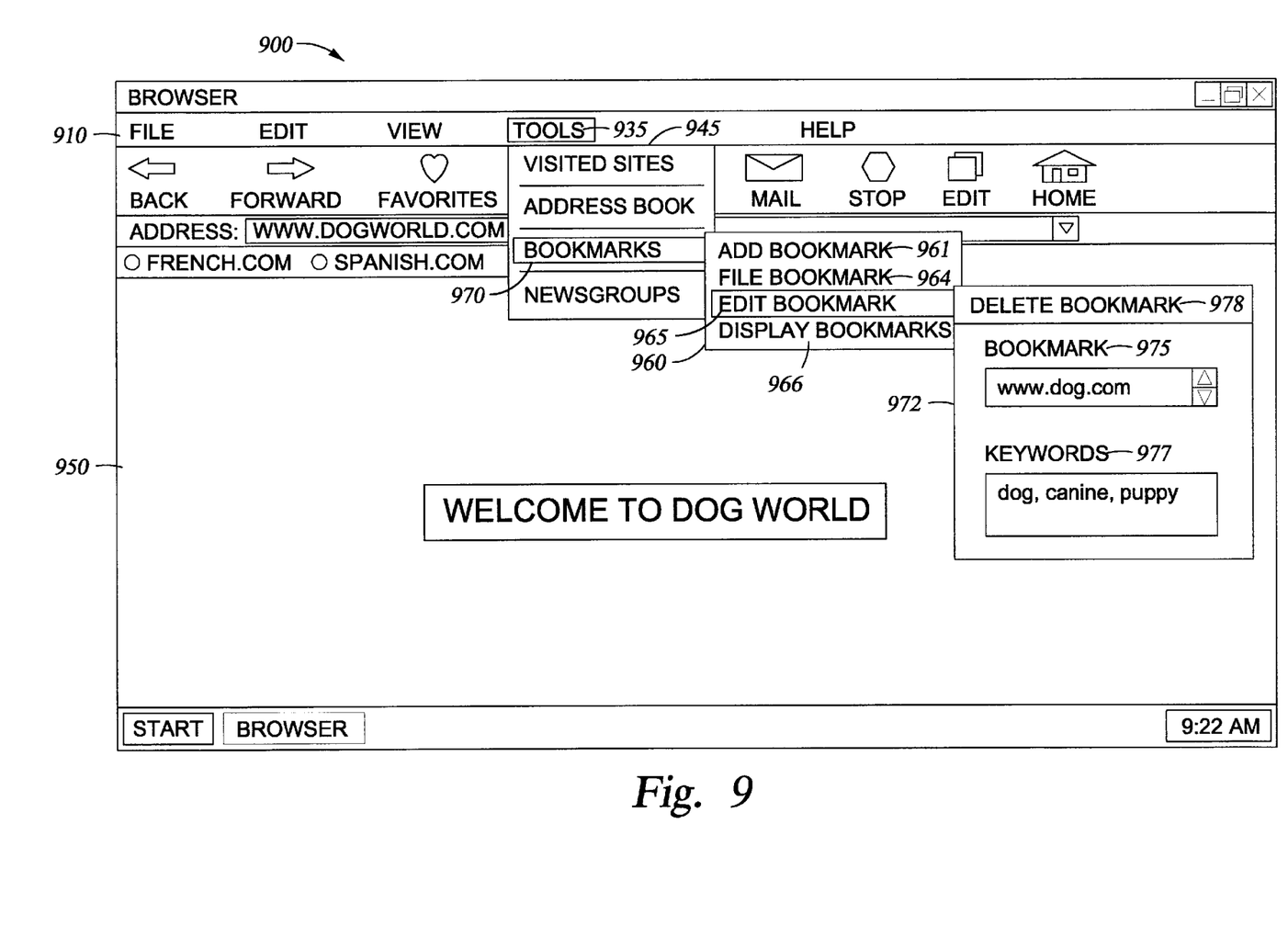
FIG. 9 depicts a graphical user interface display screen to modify subject matter associated with real-time bookmarks.

In one embodiment, the user modifies the subject matter of each bookmark to further refine bookmark relevancy by modifying the data structure 139A. FIG. 9 depicts a browser interface 900 integral to the browser program 140 for use with the present invention and may be displayed by the output device 138 (see FIG. 1) for modifying data structure 139A When the "tools" menu selection 935 of the menu toolbar 910 is accessed (i.e., "pulled down") a pull-down menu 945 appears with sub-windows to display optional browser settings and functions. When "bookmarks" selection 970 has been selected within the pull-down menu 945, a second pull-down menu 960 appears for selecting specific bookmark functions such as "adding" a bookmark 961, "editing" a bookmark 965, "filing" a bookmark 964, and a "display bookmarks" selection 966. When "edit bookmark" selection 965 is accessed, an "edit" window 972 appears to edit bookmarks and associated subject matter stored in data structure 139A. The bookmarks may be deleted using the "delete bookmark" selection 978. Bookmarks are accessed and displayed in a "bookmark" window 975. Subject matter comprising keywords, symbols, and the like related to the selected bookmark are displayed in keyword window 977. The user may edit (e.g., add, subtract, or modify, and the like) the subject matter in window 977. Thus, the user controls the subject matter of each bookmark and therefore can refine the bookmark relevancy value.

In one embodiment, some of the steps are performed by separate programs in cooperation with the browser program 140 and configuration program 141. The separate programs may be located on the client 122 or distributed within the network 126.

While the foregoing is directed to the preferred embodiment of the present invention, other and further embodiments of the invention may be devised without departing from the basic scope thereof, and the scope thereof is determined by the claims that follow.

What is claimed is:

1. A method for establishing a relevancy value between a previously-visited network resource located at a first network address and a currently-accessed network resource located at a second network address, the method comprising:

executing a browser program on a computer connected to a network of computers;

accessing, by the browser program, the currently-accessed network resource located at the second network address;

in response to accessing the currently-accessed network resource, programmatically accessing information associated with the previously-visited network resource; and determining respective relevancy values between the previously-visited network resource and the currently-accessed network resource by using the information associated with the previously-visited network resource.

2. The method of claim 1, wherein the previously-visited network address and the currently-accessed network addresses are web sites.

3. The method of claim 1, wherein determining the respective relevancy values comprises:

comparing the information associated with the previously-visited network address with information associated with the currently-accessed network address.

4. The method of claim 3, wherein the information-associated with the previously-visited network address is selected from a group consisting of at least one keyword, at least one word, at least one symbol, and at least one meta tag, and any combination thereof.

5. The method of claim 3, wherein the information associated with the currently-accessed network address is selected from a group consisting of at least one keyword, at least one word, at least one symbol, and at least one meta tag, and any combination thereof.

6. The method of claim 3, further comprising modifying at least one of the information associated with the previously-visited network address and modifying the information associated with the currently-accessed network address.

7. The method of claim 1, wherein the step of accessing comprises accessing a data structure located on the computer.

8. The method of claim 7, wherein the data structure is at least one of a bookmark file and a cache file.

9. The method of claim 1, wherein determining the relevancy value is not done with respect to a user-entered query.

10. A signal-bearing medium containing a configuration program establishing a relevancy value between a plurality of previously-visited network resources and a currently-accessed network resource, wherein the currently-accessed network resource is accessed by the browser program executing on a client computer connected to a network of computers, and wherein the configuration program, when executed by a processor, performs a method comprising:
   accessing information associated with stored addresses of the previously-visited network resources;
   determining respective relevancy values between the previously-visited network resources and the currently-accessed network resource by using the information associated with the previously-visited network resources; and
   sorting the stored addresses according to the respective relevancy values.

11. The signal-bearing medium of claim 10, wherein the configuration program is a part of the browser program.

12. The signal-bearing medium of claim 10, wherein sorting comprises ranking.

13. The signal-bearing medium of claim 10, wherein the previously-visited network resources and the currently-accessed network resource are web sites.

14. The signal-bearing medium of claim 10, wherein determining the respective relevancy values comprises:
   comparing the information associated with the previously-visited network stored addresses with information associated with the currently-accessed network address.

15. The signal-bearing medium of claim 14, wherein the information associated with the stored addresses is selected from a group consisting of at least one keyword, at least one word, at least one symbol, and at least one meta tag, and any combination thereof.

16. The signal-bearing medium of claim 14, wherein the information associated with the currently-accessed network address is selected from a group consisting of at least one keyword, at least one word, at least one symbol, and at least one meta tag, and any combination thereof.

17. The signal-bearing medium of claim 14, wherein the method further comprises modifying at least one of the information associated with the stored addresses and the information associated with the currently-accessed network address.

18. The signal-bearing medium of claim 10, wherein accessing comprises accessing a data structure located on the client computer.

19. The signal-bearing medium of claim 18, wherein the data structure is at least one of a bookmark file and a cache file.

20. The system of claim 19, wherein determining the relevancy value further comprises:
   comparing the information associated with the bookmarked addresses with information associated with the network address.

21. The system of claim 20, further comprising modifying at least one of the information associated with the bookmarked addresses and information associated with the network address.

22. The system of claim 20, wherein the information associated with the bookmarked addresses is selected from a group consisting of at least one keyword, at least one word, at least one symbol, and at least one meta tag, and any combination thereof.

23. The system of claim 22, wherein the information associated with the network address is selected from a group consisting of at least one keyword, at least one word, at least one symbol, and at least one meta tag, and any combination thereof.

24. The signal-bearing medium of claim 10, wherein determining the relevancy value is not done with respect to a user-entered query.

25. The signal-bearing medium of claim 10, wherein determining the respective relevancy values between the previously-visited network resources and the currently-accessed network resource is done solely by using the information associated with the previously-visited network resources.

26. A computer system connected to a network of computers, the computer system comprising:
   a computer comprising a processor and a memory containing (i) a bookmark file containing a plurality of bookmarked addresses, (ii) a browser program and (iii) a configuration program; and
   wherein the configuration program, when executed by the processor, is adapted to perform the steps comprising:
      in response to the browser program navigating to a network resource, accessing information associated with the bookmarked addresses; and
      determining the relevancy value between the bookmarked addresses and the network address by using the information associated with the bookmarked addresses.

27. The system of claim 26, wherein the bookmarked addresses comprise at least two bookmarked addresses and further comprising the step of:
   ranking the at least two bookmarked addresses according to a respective relevancy value.

28. The system of claim 26, wherein the network address and the bookmarked addresses are Uniform Resource Locators.

29. The system of claim 28, wherein the network address and the bookmarked addresses are web sites.

30. The system of claim 26, wherein determining the relevancy value is not done with respect to a user-entered query.

31. A method for establishing a relevancy value between a plurality of previously-visited network resources respectively located at a plurality of network addresses and a currently-accessed network resource located at a network address, wherein the plurality of network addresses are bookmarked and stored in a bookmark file, the method comprising:
   executing a browser program on a computer connected to a network of computers;

accessing, by the browser program, the currently-accessed network resource located at the network address;

in response to accessing the currently-accessed network resource, programmatically accessing information associated with the plurality of network addresses of the previously-visited network resources;

determining a respective relevancy value between each of the previously-visited network resources and the currently-accessed network resource by using the accessed information; and sorting the previously-visited network addresses according to the respective relevancy values.

32. The method of claim 31, further comprising, in response to a user accessing the bookmark file from a graphical user interface of the browser program, displaying a sorted list of the previously-visited network addresses.

33. The method of claim 31, wherein sorting comprises ranking according to the respective relevancy values.

* * * * *